US009309126B2

(12) United States Patent
Harton et al.

(10) Patent No.: US 9,309,126 B2
(45) Date of Patent: Apr. 12, 2016

(54) RAPIDLY DISSOLVABLE NANOPARTICLES

(71) Applicant: PALL CORPORATION, Port Washington, NY (US)

(72) Inventors: Shane Edward Harton, Port Washington, NY (US); Yolando David, Glen Cove, NY (US)

(73) Assignee: Pall Corporation, Port Washington, NY (US)

( * ) Notice: Subject to any disclaimer, the term of this patent is extended or adjusted under 35 U.S.C. 154(b) by 83 days.

(21) Appl. No.: 14/193,738

(22) Filed: Feb. 28, 2014

(65) Prior Publication Data

US 2015/0246818 A1    Sep. 3, 2015

(51) Int. Cl.
| | | |
|---|---|---|
| C01B 33/187 | (2006.01) | |
| C01B 33/12 | (2006.01) | |
| B01J 37/03 | (2006.01) | |
| B01J 21/08 | (2006.01) | |
| B01J 35/02 | (2006.01) | |
| B01J 35/08 | (2006.01) | |

(52) U.S. Cl.
CPC .............. *C01B 33/187* (2013.01); *C01B 33/12* (2013.01); *C01B 33/128* (2013.01); *B01J 21/08* (2013.01); *B01J 35/023* (2013.01); *B01J 35/08* (2013.01); *B01J 37/033* (2013.01); *C01P 2004/62* (2013.01); *C01P 2004/64* (2013.01); *C01P 2006/10* (2013.01); *Y10T 428/2982* (2015.01)

(58) Field of Classification Search
CPC .... C01B 33/12; C01B 33/187; C01B 33/128; C01P 2004/62; C01P 2004/64; C01P 2006/10; B01J 37/033; B01J 21/08; B01J 35/023; B01J 35/08; Y10T 428/2982
USPC ........................................................ 428/402
See application file for complete search history.

(56) References Cited

U.S. PATENT DOCUMENTS

| | | | |
|---|---|---|---|
| 2,913,419 | A | 11/1959 | Alexander |
| 2,974,108 | A | 3/1961 | Alexander |
| 4,188,418 | A | 2/1980 | Livingston |
| 4,289,600 | A | 9/1981 | Lazarz et al. |
| 4,289,681 | A | 9/1981 | Nauroth et al. |
| 4,764,497 | A | 8/1988 | Yuasa et al. |
| 4,940,571 | A | 7/1990 | Su et al. |
| 5,024,826 | A | 6/1991 | Linton |
| 5,100,581 | A | 3/1992 | Watanabe et al. |
| 5,102,917 | A | 4/1992 | Bedwell et al. |
| 5,221,497 | A | 6/1993 | Watanabe et al. |
| 5,453,260 | A | 9/1995 | Nakazawa et al. |
| 6,372,806 | B1 | 4/2002 | Keiser et al. |
| 6,548,264 | B1 | 4/2003 | Tan et al. |
| 6,680,013 | B1 | 1/2004 | Stein et al. |
| 6,770,130 | B2 | 8/2004 | Kato et al. |
| 6,800,267 | B2 | 10/2004 | Schubert et al. |
| 6,855,427 | B2 | 2/2005 | Kunkeler et al. |
| 6,890,436 | B2 | 5/2005 | Komatsu et al. |
| 6,906,109 | B2 | 6/2005 | Paszkowski |
| 6,929,764 | B2 | 8/2005 | Jiang et al. |
| 7,438,875 | B2 | 10/2008 | Do et al. |
| 7,901,727 | B2 | 3/2011 | Hofmann et al. |
| 8,003,707 | B2 | 8/2011 | Holland |
| 8,052,788 | B2 | 11/2011 | MacDonald |
| 8,163,388 | B2 | 4/2012 | Do et al. |
| 8,168,563 | B2 | 5/2012 | Do et al. |
| 8,211,193 | B2 | 7/2012 | Mahulikar et al. |
| 8,288,455 | B1 | 10/2012 | Miller |
| 8,309,113 | B2 | 11/2012 | Hofmann et al. |
| 8,431,034 | B2 | 4/2013 | Petronis et al. |
| 8,518,361 | B2 | 8/2013 | Chang et al. |
| 2005/0234136 | A1 | 10/2005 | Holland et al. |
| 2006/0283095 | A1 | 12/2006 | Mahulikar et al. |
| 2010/0155325 | A1 | 6/2010 | Zhang et al. |
| 2010/0272996 | A1 | 10/2010 | Holmes et al. |
| 2010/0311871 | A1 | 12/2010 | Suemura et al. |
| 2011/0251057 | A1 | 10/2011 | Keiser et al. |
| 2012/0107601 | A1 | 5/2012 | Weitz et al. |
| 2012/0276275 | A1 | 11/2012 | Ergang et al. |
| 2013/0115295 | A1 | 5/2013 | Wang et al. |
| 2013/0199995 | A1 | 8/2013 | Jiang et al. |

FOREIGN PATENT DOCUMENTS

| | | |
|---|---|---|
| CA | 2509628 C | 11/2007 |
| DE | 10058258 A1 | 8/2002 |
| DE | 102006010831 A1 | 9/2007 |

(Continued)

OTHER PUBLICATIONS

Stober W. et al: "Controlled growth of monodisperse silica spheres in the micron size range" JOCIS, Academic Press, New York vol. 26, No. 1, Jan. 1, 1968, pp. 62-69.*
Cai et al., "An improved convective self-assembly method for the fabrication of binary colloidal crystals and inverse structures," *Journal of Colloid and Interface Science*, 380, 42-50 (2012).
Ding et al., "Experimental Investigation of Particle-Assisted Wetting," *Journal of American Chemical Society*, 128, 4930-4931 (2006).
Gates et al., "Fabrication and Characterization of Porous Membranes with Highly Ordered Three-Dimensional Periodic Structures," *Chemistry of Materials*, 11, 2827-2836 (1999).
Hoa et al., "Preparation of porous materials with ordered hole structure," *Advances in Colloid and Interface Science*, 121, 9-23 (2006).
Holland et al., "Synthesis of Highly Ordered, Three-Dimensional, Macroporous Structures of Amorphous or Crystalline Inorganic Oxides, Phosphates, and Hybrid Composites," *Chemistry of Materials*, 11, 795-805 (1999).

(Continued)

*Primary Examiner* — Leszek Kiliman
(74) *Attorney, Agent, or Firm* — Leydig, Voit & Mayer, Ltd.

(57) ABSTRACT

Disclosed are silica nanoparticles that are suitable as templates for preparing membranes of controlled pore sizes and pore arrangements. The silica nanoparticles have a density of about 1.96 g/cm$^3$ or less. Also disclosed is a method of preparing such nanoparticles which involves reacting an orthosilicate and an alcohol or a mixture of alcohols in an aqueous medium in the presence of a salt of the metal or a metalloid compound, optionally in combination with ammonium hydroxide, isolating the resulting nanoparticles, and treating the resulting particles with an acid.

19 Claims, 4 Drawing Sheets

(56) References Cited

FOREIGN PATENT DOCUMENTS

| | | | |
|---|---|---|---|
| DE | 102006036863 A1 | | 2/2008 |
| EP | 0 477 689 A1 | | 4/1992 |
| JP | 2006199566 A | | 8/2006 |
| JP | 2010215490 A | | 9/2010 |
| JP | 2011173779 A | | 9/2011 |
| JP | 2012524014 A | | 10/2012 |
| JP | 2014009146 A | | 1/2014 |
| WO | WO 2005/063365 A1 | | 7/2005 |
| WO | WO2010/121064 | * | 10/2010 |
| WO | WO 2010/121064 A2 | | 10/2010 |
| WO | WO 2012/097967 A1 | | 7/2012 |
| WO | WO 2013/130893 A2 | | 9/2013 |

OTHER PUBLICATIONS

Jiang et al., "Large-Scale Fabrication of Wafer-Size Colloidal Crystals, Macroporous Polymers and Nanocomposites by Spin-Coating," *Journal of American Chemical Society*, 126, 13778-13786 (2004).

Jiang et al., "Single-Crystal Colloidal Multilayers of Controlled Thickness," *Chemistry of Materials*, 11, 2132-2140 (1999).

Jiang et al., "Template-Directed Preparation of Macroporous Polymers with Oriented and Crystalline Arrays of Voids," *Journal of American Chemical Society 121*, 11630-11637 (1999).

Johansson, "Controlling the Pore Size and Morphology of Mesoporous Silica," Linköping Studies in Science and Technology, Licentiate Thesis No. 1451, Linköping University, Sweden. 79 pgs. (2010).

Johnson et al., "Ordered Mesoporous Polymers of Tunable Pore Size from Colloidal Silica Templates," *Science*, 283, 963-965 (1999).

Kellenberger et al., "Soluble nanoparticles as removable pore templates for the preparation of polymer ultrafiltration membranes," *Journal of Membrane Science*, 387-388, 76-82 (2012)r.

Li et al., "Preparation of mesopomus calcium doped silica spheres with narrow size dispersion and their drug loading and degradation behavior," *Microporous and Mesoporous Materials*, 102, 151-158 (2007).

Lim et al., "Precise Size-control of Silica Nanoparticles via Aikoxy Exchange Equilibrium of Tetraethyl Orthosilicate (TEOS) in the Mixed Alcohol Solution," *Bull. Korean Chem. Soc.*, vol. 33, No. 3, pp. 1067-1070 (2012).

Mitchell et al., "Iron(III)-Doped, Silica Nanoshells: A Biodegradable Form of Silica," *Journal of American Chemical Society*, 134, 13997-14003 (2012).

Park et al., "Fabrication of Three-Dimensional Macroporous Membranes with Assemblies of Microspheres as Templates," *Chemistry of Materials*, 10, 1745-1747 (1998).

Park et al., "Macroporous Membranes with Highly Ordered and Three-Dimensionally Interconnected Spherical Pores," *Advanced Materials*, 10, 1045-1048 (1998).

Stein et al., "Colloidal crystal templating of three-dimensionally ordered macroporous solids: materials for photonics and beyond," *Current Opinion in Solid State and Materials Science*, 5, 553-564 (2001).

Stein, A., "Sphere templating methods for periodic porous solids," *Microporous and Mesoporous Materials*, 44-45, 227-239 (2001).

Ulbricht, M., "Advanced functional polymer membranes," *Polymer*, 47, 2217-2262 (2006).

Velev et al., "Colloidal crystals as templates for porous materials," *Current Opinion in Colloid and Interface Science*, 5, 56-63 (2000).

Velev et al., "Structured Porous Materials viz Colloidal Crystal Templating: From inorganic Oxides to Metals," *Advanced Materials*, 12, 531-534 (2000).

Wachner et al., "Utilising Spontaneous Self-Organization of Particles to Prepare Asymmetric, Hierarchical Membranes Comprising Microsieve-Like Parts," *Advanced Materials*, 25, 278-283 (2013).

Wang et al., "Inverse colloidal crystal microfiltration membranes," *Journal of Membrane Science*, 365, 302-310 (2010).

Wong et al., "Colloidal Crystal Films: Advances in Universality and Perfection," *Journal of American Chemical Society*, 125, 15589-15598 (2003).

Xia et al., "Monodispersed Colloidal Spheres: Old Materials with New Applications," *Advanced Materials*, 12, 693-713 (2000).

Xu et al., "Polymer-Silica Hybrid Monolayers as Precursors for Ultrathin Free-Standing Porous Membranes," *Langmuir*, 18, 2363-2367 (2002).

Yan et al., "A Simple and Effective Method for the Preparation of Porous Membranes with Three-Dimensionally Arranged Pores," *Advanced Materials*, 16, 911-915 (2004).

Yan et al,, "Hierarchically Structured Assembly of Polymer Microsieves, made by a Combination of Phase Separation Micromolding and Float-Casting," *Advanced Materials*, 24, 1551-1557 (2012).

Yan et al., "Polymer Membranes with Two-Dimensionally Arranged Pores Derived from Monolayers of Silica Particles," *Chemistry of Materials*, 16, 1622-1626 (2004).

Zakhidov et al., "Carbon Structures with Three-Dimensional Periodicity at Optical Wavelengths," *Science*, 282, 897-901 (1998).

Zhang et al., "Highly ordered perioidic mesoporous ethanesilica synthesized under neutral conditions," *J. Mater. Chem.*, 15, pp. 2562-2568 (2005).

"Sol-Gel Processes," Production of Nonoarticles lecture/seminar, Chapter 8 film presentation, Otto von Guericke Universität Magdeburg, Germany. http://www.mvt.ovgu.de/mvt_media/Vorlesungen/VO_ENAP/Folien_ENAP_8.pdf downloaded Feb. 10, 2014.

Extended European Search Report in corresponding European Application No. 14199146.3, mailed Jun. 30, 2015.

Stöber, Werner, et al., "Controlled Growth of Monodisperse Silica Spheres in the Micron Size Range," *Journal of Colloid and Interface Science*, vol. 26, pp. 62-69 (1968).

Japanese Patent Office, Office Action mailed Feb. 2, 2016 in Japanese Patent Application No. 2014-258809.

\* cited by examiner

RAPIDLY DISSOLVABLE NANOPARTICLES

BACKGROUND OF THE INVENTION

Nanoparticles, particularly silica nanoparticles, have been proposed for a number of applications including as solid support materials in column chromatography, as polishing agents in the electronics industry, membrane technology, catalyst support, silica-polymer composites, and in diagnostic and drug delivery applications. There is a desire for uniform or monodisperse nanoparticles. Further, for certain applications such as preparation of membranes having uniform pores and desired pore arrangement, where the nanoparticles may be used as templates during the preparation of the membranes, there is a desire that they be soluble in common or safe solvents. Presently known silica nanoparticles are soluble only in corrosive solvents such as hydrofluoric acid or they are slow to dissolve in common solvents, for example, a solution of alkali in water. Accordingly, there is a need for nanoparticles that are uniform in size and/or rapidly soluble in common or safe solvents.

BRIEF SUMMARY OF THE INVENTION

The invention provides silica nanoparticles having high solubility or dissolution rate in common or safe solvents, particularly in aqueous alkaline solutions. The silica nanoparticles have low particle density and high internal surface area. In embodiments, the silica nanoparticles have a diameter of about 50 nm to about 1000 nm and a particle density of about 1.96 gcm$^3$ or less.

The invention further provides a method of preparing such silica nanoparticles, the method comprising (a) reacting an orthosilicate and an alcohol or a mixture of alcohols in an aqueous medium in the presence of a salt of a metal of Group Ia or Group IIa or in the presence of a metalloid compound, optionally in combination with ammonium hydroxide, (b) isolating the resulting nanoparticles, and (c) treating the nanoparticles from (b) with an acid.

As the silica nanoparticles are highly soluble in alkalis, they are useful as removable templates for preparing membranes having controlled pore sizes and controlled spatial arrangement of pores.

DETAILED DESCRIPTION OF THE INVENTION

In accordance with an embodiment, the present invention provides silica nanoparticles having a diameter of about 50 nm to about 1000 nm and a particle density of 1.96 g/cm$^3$ or less.

In an embodiment, the silica nanoparticles of the invention having a particle density of about 1.93 to about 1.96 g/cm$^3$.

The silica nanoparticles of the invention can have a particle size, e.g., diameter, of less than 1000 nm, in particular a particle size of from about 160 nm to about 630 nm. Thus, for example, the nanoparticles have a particle size of about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

The silica nanoparticles can have any suitable shape. In embodiments, the nanoparticles of the invention are generally spherical.

The silica nanoparticles of the invention have high solubility in alkaline solutions. Solubility can be expressed by the rate of dissolution. In accordance with an embodiment, the silica nanoparticles have a rate of dissolution in 1N KOH solution of more than 10 nm/min, wherein the rate is measured by mixing 1-5 mg/mL silica nanoparticles in 1N aqueous KOH solution at 25° C. and measuring the change in diameter of the nanoparticles as a function of time by the Dynamic Light Scattering method or measuring the turbidity decay as a function of time using a nephelometric turbidity meter. Preferably, the silica nanoparticles have a rate of dissolution of about 30 nm/min or higher, and more preferably, from about 30 nm/min to about 300 nm/min.

The present invention further provides a method of preparing silica nanoparticles, the method comprising: (a) reacting an orthosilicate and an alcohol or a mixture of alcohols in an aqueous medium in the presence of a salt of a metal of Group Ia or Group IIa, or in the presence of a metalloid compound, optionally in combination with ammonium hydroxide, (b) isolating the resulting nanoparticles, and (c) treating the nanoparticles from (b) with an acid.

In an embodiment, the orthosilicate used in the preparation of the nanoparticles is a tetraalkylorthosilicate. Examples of tetraalkylorthosilicates tetramethylorthosilicate, tetraethylorthosilicate, tetrapropylorthosilicate, tetrabutylorthosilicate, and tetrapentylorthosilicate.

Any suitable alcohol or mixture of alcohols can be used in the method according to the invention, for example, the alcohol or mixture of alcohols is selected from methanol, ethanol, propanol, butanol, and mixtures thereof.

The salt of the metal used in the preparation of the nanoparticles of the invention can be selected from salts of lithium, sodium, potassium, cesium, magnesium, and calcium. In an embodiment, the salt of the metal is selected from lithium acetate, sodium acetate, sodium metasilicate, sodium formate, potassium acetate, cesium acetate, magnesium acetate, and calcium acetate. In another embodiment, the metalloid compound is a compound of boron, for example, boric acid or a boric acid ester such as alkyl borate. The alkyl borate can be a trialkyl borate such as trimethyl borate or triethyl borate.

In accordance with an embodiment, (a) is performed by mixing water, alcohol, the orthosilicate, and the salt of the metal or the metalloid compound. For example, in an embodiment, (a) can be performed by mixing about 2 to 25 mol/L of water, about 8 to about 16 mol/L of ethanol, about 0 to about 2 mol/L of methanol, about 0.1 to about 2 mol/L of ammonia, about 0.1 to about 0.4 mol/L of tetraalkylorthosilicate, and about 0.001 to about 0.01 mol/L of a salt of the metal or metalloid compound.

Alternatively, (a) can be performed by adding an orthosilicate into a solution comprising the salt of the metal or the metalloid compound, water, and alcohol. For example, (a) can be performed by adding about 0.1 to about 0.4 mol/L of tetraalkylorthosilicate into a solution including about 2 to 25 mol/L of water, about 8 to about 16 mol/L of ethanol, about 0 to about 2 mol/L of methanol, about 0.1 to about 2 mol/L of ammonia, and about 0.001 to about 0.01 mol/L of a salt of a metal or metalloid compound and mixing the resulting mixture.

In (a), the mixing is carried out for a suitable period of time, e.g., from about 5 minutes to about 2 hours, or from about 30 minutes to about 1 hour.

In (a), the mixing is carried out at a suitable temperature, e.g., from about 20° C. to about 50° C. or from about 25° C. to about 35° C.

The resulting nanoparticles are isolated by centrifugal separation followed by washing with an alcohol, preferably repeatedly.

In (c), any suitable acid can be employed, preferably a mineral acid or an organic acid. Examples of mineral acids include hydrochloric acid, sulfuric acid, and nitric acid, preferably hydrochloric acid or sulfuric acid. Examples of organic acids include acetic acid, formic acid, trifluoroacetic acid, trichloroacetic acid, and p-toluenesulfonic acid, preferably formic acid. The nanoparticles isolated in (b) can be treated with a 1N to 2N mineral acid, e.g., 1N HCl, or 10-50 weight % organic acid in water, e.g., 50% aqueous formic acid, for a period of about 0.5 hr to about 3 hr, preferably about 1 hr to 2 hr. For example, the nanoparticles can be sonicated in an acid bath for the above period. Following the acid treatment, the nanoparticles are isolated from the acid and washed with deionized water and dried under vacuum to obtain the silica nanoparticles of the invention.

Figure 1:
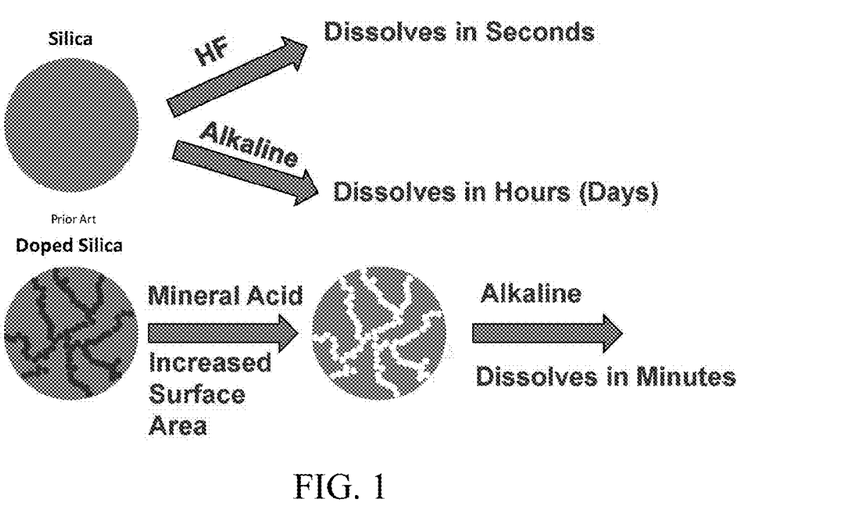
FIG. 1 compares the features of the silica nanoparticles of the present invention to the features of prior art silica nanoparticles.

FIG. 1 illustrates the increased surface area of the silica nanoparticles of the present invention relative to that of prior art silica particles. Without wishing to be bound by any theory or mechanism, the enhanced solubility of the silica nanoparticles is due to the increased surface area created by the acid treatment on the silica nanoparticles formed by the reaction of the orthosilicate, alcohol, and ammonia in the presence of the metal salt or metalloid compound.

The invention also provides nanoparticles prepared by the method described above.

The following examples further illustrate the invention but, of course, should not be construed as in any way limiting its scope.

EXAMPLE 1

This example demonstrates the preparation of silica nanoparticles in accordance with an embodiment of the invention, where lithium acetate was used as the metal salt in (a).

Figure 2:
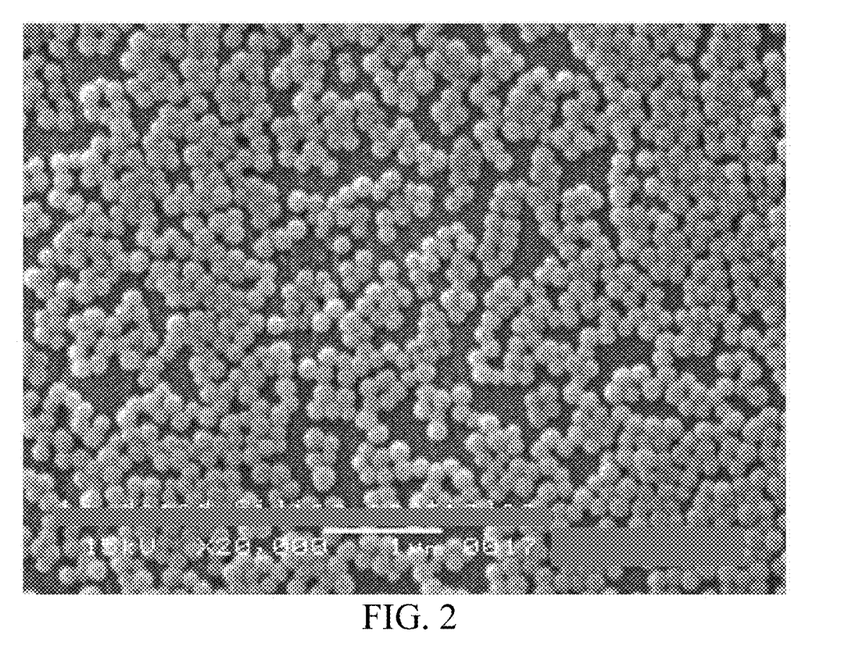
FIG. 2 depicts an SEM micrograph of silica nanoparticles having an SEM diameter of 160 nm, in accordance with an embodiment of the invention where a lithium salt was employed in its preparation.

In a 6 L jacketed flask kept at 25° C., 4.8 g lithium acetate dihydrate (LiOAc.2H$_2$O), 2480 mL deionized water (DI-H$_2$O), 2.9 L anhydrous ethanol (EtOH), and 120 mL 28% w/w NH$_3$ in water were stirred for 30 min at 200 rpm using an overhead mixer with PTFE impellers. A solution of 300 mL EtOH with 200 mL tetraethylorthosilicate (TEOS), which was prepared under dry conditions (<10% relative humidity), was rapidly poured into the 6 L flask, and mixing was increased to 400 rpm and a dry air purge (<1% relative humidity) was utilized for 5 min. Mixing was reduced to 200 rpm, the dry air purge was removed, the flask was sealed, and the reaction continued for a total of 1 h. The particles were purified by centrifugation and re-suspension in EtOH three times. The particles were sonicated with 1N HCl, washed with DI water, and dried under vacuum at 40° C. The SEM micrograph depicted in FIG. 2 show that the particles are generally spherical. Dynamic light scattering (DLS) showed a hydrodynamic diameter of 180 nm. Elemental analysis was performed on the particles before and after the HCl treatment.

For this example, as well as the following examples, Table 1 sets forth the reaction conditions and the particle diameter and shape, and Table 2 sets forth the % carbon before and after HCl treatment, the % metal content before and after HCl treatment, the density, and the dissolution rate before and after treatment with HCl.

TABLE 1

Reaction conditions and properties of nanoparticles

| Example | [H$_2$O] | [NH$_3$] | [Salt] | [TEOS] | Diameter (DLS) nm | Diameter (SEM) nm | Shape |
|---|---|---|---|---|---|---|---|
| 1 | 23.7 | 0.3 | 0.0078 | 0.15 | 180 | 160 | Generally Spherical |
| 2 | 23.07 | 0.9 | 0.0078 | 0.15 | 330 | 310 | Generally Spherical |
| 3 | 23.7 | 1 | 0.0078 | 0.15 | 560 | 540 | Generally Spherical |
| 4 | 23.5 | 0.5 | 0.0078 | 0.15 | 310 | 270 | Generally Spherical |
| 5 | 23.5 | 0.5 | 0.0078 | 0.15 | 310 | 270 | Generally Spherical |
| 6 | 23.9 | 1 | 0.0062 | 0.15 | 340 | 320 | Generally Spherical |
| 7 | 23.9 | 1 | 0.0078 | 0.15 | 340 | 350 | Generally Spherical |
| 8 | 23.9 | 1 | 0.0062 | 0.15 | 310 | 320 | Generally Spherical |
| 9 | 24 | 0.5 | 0.0062 | 0.15 | 310 | 260 | Generally Spherical |
| 10 | 23.9 | 1 | 0.0062 | 0.15 | 270 | 270 | Generally Spherical |
| 11 | 24 | 0.5 | 0.0046 | 0.15 | | | Precipitated/Nonspherical |
| 12 | 23.9 | 1 | 0.0062 | 0.15 | 630 | 440 | Nonspherical |
| 13 | 24 | 0.5 | 0.0046 | 0.15 | | | Precipitated/Nonspherical |
| 14 | 5 | 0.5 | 0.0062 | 0.2 | 290 | 280 | Generally Spherical |
| 15 | 20.7 | 0.5 | 0 | 0.15 | 180 | 190 | Generally Spherical |
| 16 | 23.9 | 1 | 0 | 0.15 | 240 | 225 | Generally Spherical |

TABLE 2

Properties of nanoparticles

| Example | % Carbon Before HCl | % Carbon After HCl | Metal | % Metal Before HCl | ppm Metal After HCl | Density g/cc | Dissolution Rate After HCl nm/min | Dissolution Rate Before HCl nm/min |
|---|---|---|---|---|---|---|---|---|
| 1 | 4.3 | 0.43% | Li | 0.26 | <8 | 1.94 | 30 | 1-10 |
| 2 | 4.9 | 0.78% | Li | 0.31 | <8 | 1.93 | 40 | 1-10 |
| 3 | 3.4 | 0.64% | Na | 2.8 | <16 | 1.96 | 30 | 1-10 |
| 4 | 3.2 | | Na | 0.89 | | | 50 | 1-10 |
| 5 | 3.1 | | Na | 0.92 | | | 50 | 1-10 |
| 6 | 2.7 | | K | 1.9 | | | 120 | 1-10 |
| 7 | 2.2 | 0.76% | K | 2.3 | <49 | | 150 | 1-10 |
| 8 | 2.9 | | Cs | 5.9 | | | 130 | 1-10 |
| 9 | 2.3 | 0.87% | Cs | 6.9 | <49 | | 60 | 1-10 |
| 10 | 4.1 | | Mg | 0.11 | | | 180 | 1-10 |
| 11 | 4.2 | | Mg | 0.03 | | | | |
| 12 | 3.4 | | Ca | 0.87 | | | 260 | 1-10 |
| 13 | 3.4 | | Ca | 0.86 | | | | |
| 14 | 3.9 | | B | 0.53 | | | 200 | 1-10 |
| 15 | 3.5 | | | | | | 10 | 1-10 |
| 16 | 3.8 | 0.83% | | | | | 10 | 1-10 |

EXAMPLE 2

This example demonstrates another preparation of nanoparticles in accordance with an embodiment of the invention, where lithium acetate was used as the salt in (a).

Figure 3:
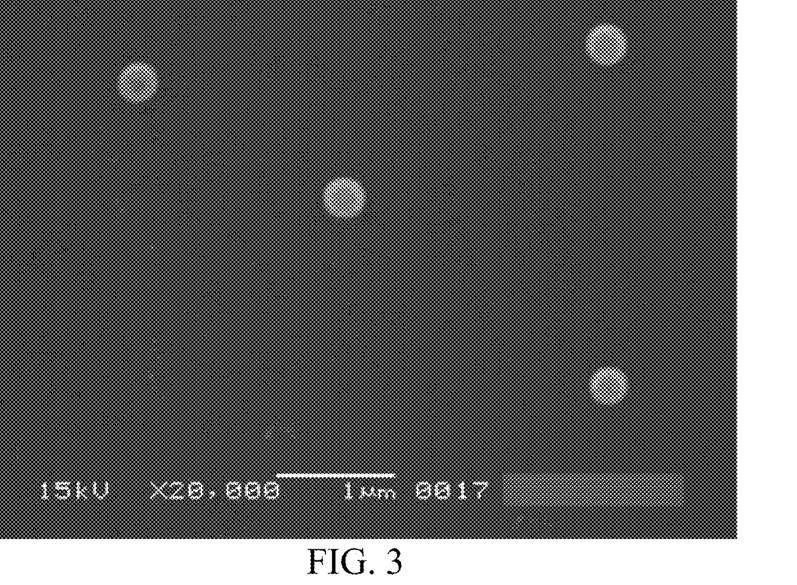
FIG. 3 depicts an SEM micrograph of the silica nanoparticles having an SEM diameter of 310 nm, in accordance with an embodiment of the invention where also a lithium salt was employed in its preparation.

In a 6 L jacketed flask kept at 25° C., 4.8 g LiOAc.2H$_2$O, 2240 mL DI-H$_2$O, 2.9 L EtOH, and 360 mL 28% w/w NH$_3$ in water were stirred for 30 min at 200 rpm using an overhead mixer with PTFE impellers. A solution of 300 mL EtOH with 200 mL TEOS prepared under dry conditions (<10% relative humidity) was rapidly poured into the 6 L flask, and mixing was increased to 400 rpm and a dry air purge (<1% relative humidity) was utilized for 5 min. Mixing was reduced to 200 rpm, the dry air purge was removed, the flask was sealed, and the reaction continued for a total of 1 h. The particles were purified by centrifugation and re-suspension in EtOH three times. SEM micrograph depicted in FIG. 3 shows that the particles are generally spherical. The particles were sonicated with 1N HCl, washed with DI water, and dried under vacuum at 40° C. The particles were characterized as in Example 1 and the results obtained are also set forth in Tables 1-2.

EXAMPLE 3

This example demonstrates the preparation of nanoparticles in accordance with an embodiment of the invention, where sodium metasilicate was used as the salt in (a).

Figure 4:
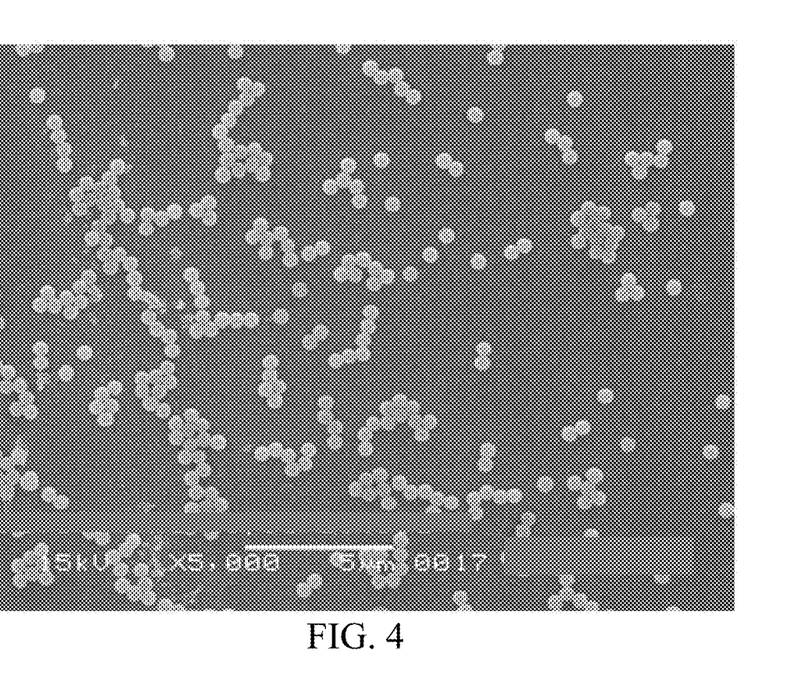
FIG. 4 depicts an SEM micrograph of silica nanoparticles, having an SEM diameter of 540 nm, in accordance with an embodiment of the invention where a sodium salt was employed in its preparation.

In a 6 L jacketed flask kept at 25 C, 10 g sodium metasilicate pentahydrate (Na$_2$SiO$_3$.5H$_2$O), 2280 mL DI-H$_2$O, 1080 mL EtOH, 240 mL methanol (MeOH), and 400 mL 28% w/w NH$_3$ in water were stirred for 30 min at 200 rpm using an overhead mixer with PTFE impellers. A solution of 1800 mL EtOH with 200 mL TEOS prepared under dry conditions (<10% relative humidity) was rapidly poured into the 6 L flask, and mixing was increased to 500 rpm and a dry air purge (<1% relative humidity) was utilized for 5 min. Mixing was reduced to 200 rpm, the dry air purge was removed, the flask was sealed, and the reaction continued for a total of 1 h. The particles were purified by centrifugation and re-suspension in EtOH three times. DLS showed a hydrodynamic diameter of 560 nm. SEM micrographs of the particles are depicted in FIG. 4, showing that the particles are generally spherical. The particles were sonicated with 1N HCl, sulfuric acid, or formic acid, washed with DI water, and dried under vacuum at 40° C. The particles were characterized as in Example 1 and the results obtained on the HCl washed particles are also set forth in Tables 1-2. Sulfuric acid and formic acid treatments, followed by drying, produced particles having a carbon content<0.5 wt % and a sodium content of <23 ppm. The nanoparticles produced after treatment with HCl, sulfuric acid, and formic acid were rapidly dissolvable in aqueous alkaline solution.

EXAMPLE 4

This example demonstrates the preparation of another set of nanoparticles in accordance with an embodiment of the invention where sodium acetate was used as the salt in (a).

In a 1 L Erlenmeyer flask at room temperature (23° C.), 0.64 g sodium acetate trihydrate (NaOAc.3H$_2$O), 240 mL DI-H$_2$O, 220 mL EtOH, and 20 mL 28% w/w NH$_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2.

EXAMPLE 5

This example demonstrates the preparation of yet another set of nanoparticles in accordance with an embodiment of the invention where sodium formate was employed as the metal salt in (a).

In a 1 L Erlenmeyer flask at room temperature (23° C.), 0.32 g sodium formate (HCOONa), 240 mL DI-H$_2$O, 220 mL EtOH, and 20 mL 28% w/w NH$_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2.

EXAMPLE 6

This example demonstrates the preparation of nanoparticles in accordance with an embodiment of the invention where potassium acetate was employed as the metal salt in (a).

In a 1 L Erlenmeyer flask at room temperature (23° C.), 0.37 g potassium acetate (KOAc), 230 mL DI-$H_2O$, 210 mL EtOH, and 40 mL 28% w/w $NH_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. Particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2.

EXAMPLE 7

This example demonstrates the preparation of another set of nanoparticles in accordance with an embodiment of the invention where potassium acetate was employed as the metal salt in (a).

In a 1 L Erlenmeyer flask at room temperature (23° C.), 0.46 g potassium acetate (KOAc), 230 mL DI-$H_2O$, 210 mL EtOH, and 40 mL 28% w/w $NH_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2.

EXAMPLE 8

This example demonstrates the preparation of nanoparticles in accordance with an embodiment of the invention, where cesium acetate was employed as the metal salt in (a).

In a 1 L Erlenmeyer flask at room temperature (23° C.), 0.72 g cesium acetate (CsOAc), 230 mL DI-$H_2O$, 210 mL EtOH, and 40 mL 28% w/w $NH_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2.

EXAMPLE 9

This example demonstrates the preparation of another set of nanoparticles in accordance with an embodiment of the invention, where cesium acetate was employed as the metal salt in (a).

In a 1 L Erlenmeyer flask at room temperature (23° C.), 0.72 g cesium acetate (CsOAc), 245 mL DI-$H_2O$, 215 mL EtOH, and 20 mL 28% w/w $NH_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. Particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2.

EXAMPLE 10

This example demonstrates the preparation of nanoparticles in accordance with an embodiment of the invention where magnesium acetate was employed as the metal salt in (a).

Figure 6:
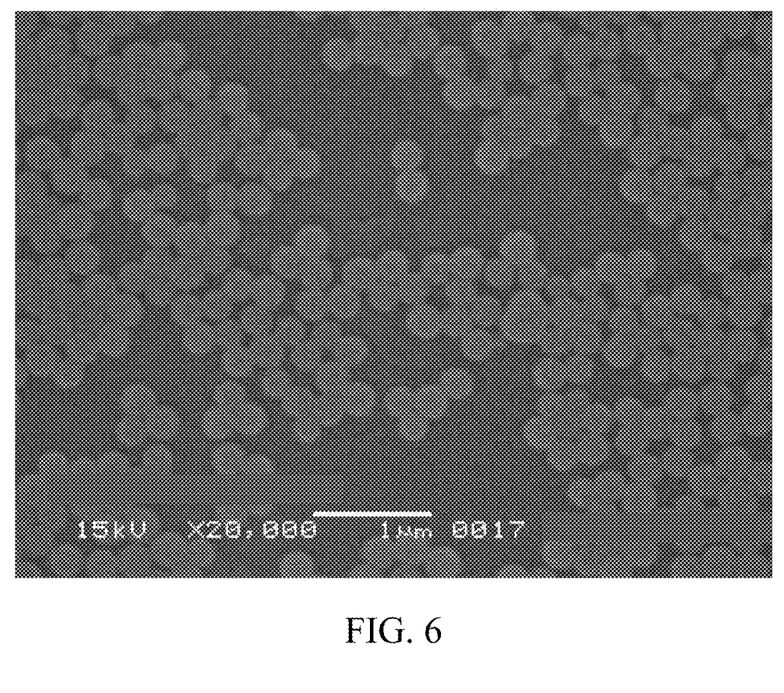
FIG. 6 depicts an SEM micrograph of silica nanoparticles having an SEM diameter of 270 nm, in accordance with an embodiment of the invention where a magnesium salt was employed in its preparation.

In a 1 L Erlenmeyer flask at room temperature (23° C.), 0.80 g magnesium acetate tetrahydrate (MgOAc.4$H_2O$), 230 mL DI-$H_2O$, 210 mL EtOH, and 40 mL 28% w/w $NH_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2. SEM micrographs depicted in FIG. 6 showed that generally spherical particles.

EXAMPLE 11

This example demonstrates the preparation of another set of nanoparticles in accordance with an embodiment of the invention where magnesium acetate was employed as the metal salt in (a).

In a 1 L Erlenmeyer flask at room temperature (23° C.), 0.59 g magnesium acetate tetrahydrate (MgOAc.4$H_2O$), 245 mL DI-$H_2O$, 215 mL EtOH, and 20 mL 28% w/w $NH_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The final reaction mixture contained precipitated particles. The particles were purified by washing with EtOH three times. The particles were sonicated with 1N HCl, washed with DI water, and dried under vacuum at 40° C. The particles were characterized as in Example 1 and the results obtained are also set forth in Tables 1-2.

EXAMPLE 12

This example demonstrates the preparation of nanoparticles in accordance with an embodiment of the invention where calcium acetate was employed as the metal salt in (a).

Figure 5:
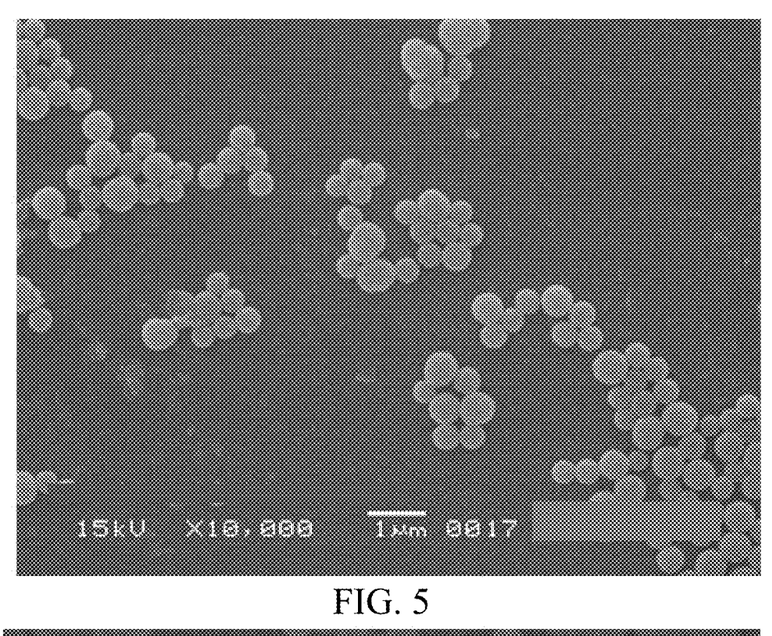
FIG. 5 depicts an SEM micrograph of silica nanoparticles having an SEM diameter of 440 nm, in accordance with an embodiment of the invention where a calcium salt was employed in its preparation.

In a 1 L Erlenmeyer flask at room temperature (23° C.), 0.66 g calcium acetate monohydrate (CaOAc.$H_2O$), 230 mL DI-$H_2O$, 210 mL EtOH, and 40 mL 28% w/w $NH_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2. SEM micrographs of the nanoparticles depicted in FIG. 5 show that the nanoparticles are non-spherical.

EXAMPLE 13

This example demonstrates the preparation of another set of nanoparticles in accordance with an embodiment of the invention where calcium acetate was employed as the metal salt in (a).

In a 1 L Erlenmeyer flask at room temperature (23° C.), 0.49 g calcium acetate monohydrate (CaOAc.H$_2$O), 245 mL DI-H$_2$O, 215 mL EtOH, and 20 mL 28% w/w NH$_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The final reaction mixture contained precipitated particles. SEM of the nanoparticles showed that the nanoparticles are non-spherical and are highly aggregated. Particles were purified by washing with EtOH three times. The particles were sonicated with 1N HCl, washed with DI water, and dried under vacuum at 40° C. The particles were characterized as in Example 1 and the results obtained are also set forth in Tables 1-2.

EXAMPLE 14

This example demonstrates the preparation of nanoparticles in accordance with an embodiment of the invention where boric acid was employed as the metalloid compound in (a).

Figure 7:
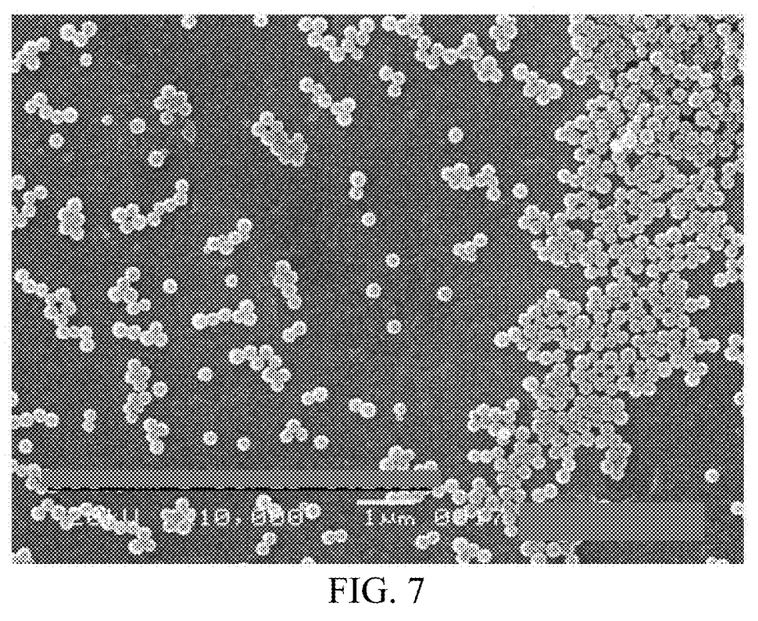
FIG. 7 depicts the SEM micrograph of silica nanoparticles, having an SEM diameter of 280 nm, in accordance with an embodiment of the invention where a boric acid was employed in its preparation.

In a 6 L jacketed flask kept at 25° C., 2.3 g boric acid, 380 mL DI-H$_2$O, 5 L EtOH, and 200 ml, 28% w/w NH$_3$ in water were stirred for 30 min at 200 rpm using an overhead mixer with PTFE impellers. A solution of 150 mL EtOH with 270 mL TEOS prepared under dry conditions (<10% relative humidity) was rapidly poured into the 6 L flask, and mixing was increased to 400 rpm and a dry air purge (<1% relative humidity) was utilized for 5 min. Mixing was reduced to 200 rpm, the dry air purge was removed, the flask was sealed, and the reaction continued for a total of 1.5 h. The particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2. An SEM of the nanoparticles is shown in FIG. 7.

EXAMPLE 15

This example demonstrates the preparation of nanoparticles where no salt of metal or metalloid was used.

In a 1 L Erlenmeyer flask at room temperature (23° C.), 210 mL DI-H$_2$O, 250 mL EtOH, and 20 mL 28% w/w NH$_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2.

EXAMPLE 16

This example demonstrates the preparation of another set of nanoparticles where no salt of metal or metalloid was used.

In a 1 L Erlenmeyer flask at room temperature (23° C.), 230 mL DI-H$_2$O, 210 mL EtOH, and 40 mL 28% w/w NH$_3$ in water were stirred for 30 min at 200 rpm using a magnetic stir bar. A solution of 100 mL EtOH with 20 mL TEOS prepared under dry conditions (<10% relative humidity) was rapidly poured into the 1 L flask, the flask was sealed, and the reaction continued for a total of 1 h. The particles were purified by centrifugation and re-suspension in EtOH three times. The particles were sonicated with 1N HCl, washed with DI water, and dried under vacuum at 40° C. The particles were characterized as in Example 1 and the results obtained are also set forth in Tables 1-2. SEM showed that the particles are generally spherical.

EXAMPLE 17

This example demonstrates the measurement of the density of the nanoparticles in accordance with the invention.

A suspension of either commercial particles in water or dissolvable nanoparticles in DMF was measured for weight fraction of particles. A small quantity (approximately 2 g) was placed into a vial, dried in an oven at 90° C. for 3 days, and the weight was measured before and after drying. A 25 mL specific gravity bottle was calibrated using water with a known density. The density of the suspensions was measured using the specific gravity bottle. The density of the particles was determined using the following equation:

$$\rho_p = \frac{f_p}{\frac{1}{\rho} - \frac{1 - f_p}{\rho_s}}$$

where $\rho_p$ is the density of the particle, $\rho$ is the density of the suspension as measured by the specific gravity bottle, $\rho_s$ is the density of the solvent (1.0 g/cc for water and 0.944 g/cc for DMF) and $f_p$ is the weight fraction of particle in the suspension as measured by the drying experiment. The results obtained are summarized in Table 3.

TABLE 3

Density of Silica Nanoparticles

| Particles | Solvent | Solvent Density g/cm$^3$ | W/W Particles | Density Suspension g/cm$^3$ | Particle Density g/cm$^3$ |
|---|---|---|---|---|---|
| EM-3530K* | Water | 1.0 | 0.306 | 1.20 | 2.24 |
| EM-5530K* | Water | 1.0 | 0.305 | 1.20 | 2.25 |
| EM-7530K* | Water | 1.0 | 0.302 | 1.20 | 2.27 |
| 570 nm Silica (Ex. 3) | DMF | 0.944 | 0.63 | 1.40 | 1.96 |
| 310 nm Silica (Ex. 2) | DMF | 0.944 | 0.55 | 1.31 | 1.93 |
| 160 nm Silica (Ex. 1) | DMF | 0.944 | 0.55 | 1.31 | 1.94 |

*commercial silica nanoparticles.

The diameter, the carbon content, and the dissolution rate of the commercial silica nanoparticles are set forth in Table 4.

TABLE 4

Properties of commercial silica nanoparticles

| Particles | Diameter (DLS) nm | % Carbon | Dissolution Rate nm/min |
|---|---|---|---|
| EM-3530K* | 30 | <0.5 | 0.05 |
| EM-5530K* | 55 | <0.5 | 0.08 |
| EM-7530K* | 75 | <0.5 | 0.08 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Silica nanoparticles having a diameter of about 50 nm to about 1000 nm, a particle density of about 1.96 g/cm$^3$ or less, and a rate of dissolution in 1N KOH solution of more than 10 nm/min, wherein the rate is measured by mixing 1-5 mg/mL silica nanoparticles in 1N aqueous KOH solution at 25° C. and measuring the change in diameter as a function of time by the Dynamic Light Scattering method or measuring the turbidity decay as a function of time using a nephelometric turbidity meter.

2. The silica nanoparticles of claim 1, having a particle density of about 1.93 to about 1.96 g/cm$^3$.

3. The silica nanoparticles of claim 1, having a particle size of from about 160 nm to about 630 nm.

4. The silica nanoparticles of claim 1, which are generally spherical.

5. The silica nanoparticles of claim 1, having a rate of dissolution of about 30 nm/min or higher.

6. The silica nanoparticles of claim 1, having a rate of dissolution of about 30 nm/min to about 300 nm/min.

7. A method of preparing silica nanoparticles having a diameter of about 50 nm to about 1000 nm, a particle density of about 1.96 g/cm$^3$ or less, and a rate of dissolution in 1N KOH solution of more than 10 nm/min, wherein the rate is measured by mixing 1-5 mg/mL silica nanoparticles in 1N aqueous KOH solution at 25° C. and measuring the change in diameter as a function of time by the Dynamic Light Scattering method or measuring the turbidity decay as a function of time using a nephelometric turbidity meter, said method comprising:

(a) reacting an orthosilicate and an alcohol or a mixture of alcohols in an aqueous medium in the presence of a salt of a metal of Group Ia or Group IIa or in the presence of a metalloid compound, optionally in combination with ammonium hydroxide, b) isolating the resulting nanoparticles, and (c) treating the nanoparticles from (b) with an acid.

8. The method of claim 7, wherein the orthosilicate is a tetraalkylorthosilicate.

9. The method of claim 7, wherein the orthosilicate is selected from tetramethylorthosilicate, tetraethylorthosilicate, tetrapropylorthosilicate, tetrabutylorthosilicate, and tetrapentylorthosilicate.

10. The method of claim 7, wherein the alcohol or mixture of alcohols is selected from methanol, ethanol, propanol, butanol, and mixtures thereof.

11. The method of claim 7, wherein the salt of the metal is selected from salts of lithium, sodium, potassium, cesium, magnesium, and calcium.

12. The method of claim 7, wherein the salt of the metal is selected from lithium acetate, sodium acetate, sodium metasilicate, sodium formate, potassium acetate, cesium acetate, magnesium acetate, and calcium acetate.

13. The method of claim 7, wherein the metalloid compound is a compound of boron.

14. The method of claim 13, wherein the compound of boron is boric acid or an alkyl borate.

15. The method of claim 7, wherein (a) is performed by mixing water, alcohol, the orthosilicate, and the salt of the metal or the metalloid compound.

16. The method of claim 15, comprising mixing about 2 to 25 mol/L of water, about 8 to about 16 mol/L of ethanol, about 0 to about 2 mol/L of methanol, about 0.1 to about 2 mol/L of ammonia, about 0.1 to about 0.4 mol/L of tetraalkylorthosilicate, and about 0.001 to about 0.01 mol/L of a salt of the metal or metalloid compound.

17. The method of claim 7, wherein (a) is performed by adding an orthosilicate into a solution comprising the salt of the metal or the metalloid compound, water, and alcohol.

18. The method of claim 17, comprising adding about 0.1 to about 0.4 mol/L of tetraalkylorthosilicate into a solution including about 2 to 25 mol/L of water, about 8 to about 16 mol/L of ethanol, about 0 to about 2 mol/L of methanol, about 0.1 to about 2 mol/L of ammonia, and about 0.001 to about 0.01 mol/L of a salt of a metal or metalloid compound and mixing the resulting mixture.

19. The nanoparticles prepared by the method of claim 7.

* * * * *